(12) United States Patent
Yang

(10) Patent No.: US 10,486,466 B1
(45) Date of Patent: Nov. 26, 2019

(54) DIRECTIONAL CASTOR STRUCTURE

(71) Applicant: Sunny Castors Co., Ltd., Tainan Hsien (TW)

(72) Inventor: Feng-Hsi Yang, Tainan (TW)

(73) Assignee: Sunny Castors Co., Ltd., Tainan Hsien (TW)

( * ) Notice: Subject to any disclaimer, the term of this patent is extended or adjusted under 35 U.S.C. 154(b) by 0 days.

(21) Appl. No.: 16/212,793

(22) Filed: Dec. 7, 2018

(51) Int. Cl.
*B60B 33/00* (2006.01)
*B60B 33/02* (2006.01)

(52) U.S. Cl.
CPC ........ *B60B 33/021* (2013.01); *B60B 33/0039* (2013.01); *B60B 33/0049* (2013.01); *B60B 33/0057* (2013.01); *B60B 33/0068* (2013.01); *B60B 33/0078* (2013.01); *B60B 2200/22* (2013.01); *B60B 2200/242* (2013.01); *B60B 2200/40* (2013.01); *B60B 2900/321* (2013.01)

(58) Field of Classification Search
CPC . Y10T 16/195; Y10T 16/196; B60B 33/0094; B60B 33/0039; B60B 33/0049; B60B 33/0057; B60B 33/0068; B60B 33/0084; B60B 33/0092; B60B 33/025; B60B 33/021; B60B 33/0042; B60B 33/0078; B60B 33/0086; B60B 37/10; B60B 2200/222; B60B 2200/22; B60B 2200/242; B60B 2200/40; B60B 2900/531; B60B 2900/321; A61G 7/0528
See application file for complete search history.

(56) References Cited

U.S. PATENT DOCUMENTS

| | | | | | |
|---|---|---|---|---|---|
| 4,677,706 | A | * | 7/1987 | Screen | B60B 33/0042 16/35 R |
| 5,184,373 | A | * | 2/1993 | Lange | B60B 33/00 16/35 R |
| 5,242,035 | A | * | 9/1993 | Lange | B60B 33/021 16/35 R |
| 5,774,936 | A | * | 7/1998 | Vetter | B60B 33/021 16/35 R |
| 6,584,641 | B1 | * | 7/2003 | Milbredt | B60B 33/0021 16/35 R |
| 7,810,613 | B2 | * | 10/2010 | Lin | B60B 33/0021 16/35 R |
| 8,051,533 | B2 | * | 11/2011 | Block | B60B 33/0028 16/35 R |

(Continued)

*Primary Examiner* — Chuck Y Mah
(74) *Attorney, Agent, or Firm* — Alan D. Kamrath; Mayer & Williams PC

(57) ABSTRACT

A castor structure includes a wheel support unit, an operation unit, a locking member, a directional member, a directional brake member, a bent elastic bar, and two resting members. The operation unit includes a drive shank formed with an annular groove which has an upper tapered face and a lower tapered face. The locking member includes a plurality of locking teeth. The directional brake member includes a plurality of directional toothed grooves. The elastic bar extends through the directional member and the annular groove. Thus, the elastic bar is stretched outward by the annular groove of the drive shank when the drive shank is moved downward, to provide a micro-adjustment effect, such that the directional toothed grooves of the directional brake member align with and exactly engage the locking teeth of the locking member.

5 Claims, 7 Drawing Sheets

(56) References Cited

U.S. PATENT DOCUMENTS

| | | | |
|---|---|---|---|
| 8,365,354 B1* | 2/2013 | Fan | B60B 33/04 |
| | | | 16/18 R |
| 8,418,315 B1* | 4/2013 | Lin | B60B 33/0084 |
| | | | 16/35 D |
| 8,499,413 B1* | 8/2013 | Tsai | B60B 33/02 |
| | | | 16/35 R |
| 8,850,657 B1* | 10/2014 | Yang | B60B 33/0042 |
| | | | 16/18 R |
| 9,139,043 B1* | 9/2015 | Fan | B60B 33/0028 |
| 9,139,044 B1* | 9/2015 | Tsai | B60B 33/021 |
| 2004/0117943 A1* | 6/2004 | Block | B60B 33/0039 |
| | | | 16/18 R |
| 2008/0115324 A1* | 5/2008 | Block | B60B 33/0021 |
| | | | 16/35 R |
| 2011/0120815 A1* | 5/2011 | Frolik | A61G 7/018 |
| | | | 188/1.12 |
| 2012/0255141 A1* | 10/2012 | Lin | B60B 33/0081 |
| | | | 16/45 |

\* cited by examiner

DIRECTIONAL CASTOR STRUCTURE

BACKGROUND OF THE INVENTION

1. Field of the Invention

The present invention relates to a castor and, more particularly, to a directional (or orientating) castor structure for a medical bed, a machine, a chair or furniture.

2. Description of the Related Art

A castor is mounted on the bottom of an object or equipment, such as a chair, a medical bed or the like, to facilitate movement of the object. A conventional castor comprises an upper part having a first toothed mechanism and a lower part having a second toothed mechanism. When the upper part is moved downward, the first toothed mechanism is moved to engage the second toothed mechanism of the lower part, thereby achieving a braking effect, so as to stop movement of the object. However, when the first toothed mechanism of the upper part misaligns with the second toothed mechanism of the lower part during movement of the upper part, the first toothed mechanism of the upper part cannot engage the second toothed mechanism of the lower part exactly, such that the user has to try many times to align the first toothed mechanism of the upper part with the second toothed mechanism of the lower part, thereby causing inconvenience to the user. In addition, when the first toothed mechanism of the upper part misaligns with the second toothed mechanism of the lower part, a larger force is applied on a contact area between the first toothed mechanism of the upper part and the second toothed mechanism of the lower part, such that the first toothed mechanism of the upper part and the second toothed mechanism of the lower part are easily worn out during a long-term utilization, thereby decreasing the lifetime of the castor.

BRIEF SUMMARY OF THE INVENTION

The primary objective of the present invention is to provide a durable castor structure that has an exactly braking function and is used conveniently.

In accordance with the present invention, there is provided a castor structure comprising a wheel support unit, an operation unit mounted on the wheel support unit, a locking member mounted on the operation unit, a directional member mounted in the wheel support unit, a directional brake member located under the directional member, a bent elastic bar mounted on the directional member, and two resting members mounted on the directional member. The wheel support unit includes a housing, and a tube pivotally mounted on a top of the housing. The housing has a bottom formed with a housing chamber. The tube has an interior formed with a tube chamber connected to the housing chamber of the housing. The operation unit includes a drive shank extending through the tube chamber of the tube. The drive shank has an upper end received in the tube chamber of the tube and a lower end received in the housing chamber of the housing. The drive shank has a periphery formed with an annular groove which has an upper tapered face and a lower tapered face. The locking member includes a locking body secured to the lower end of the drive shank, two locking blocks protruding from a periphery of the locking body, and a plurality of locking teeth mounted on a bottom of the locking body. The directional member includes an upper directional body mounted in the housing chamber of the housing. The upper directional body is provided with two inner recesses adjoining each other, two outer recesses located beside the two inner recesses respectively, and two stop walls located between the two inner recesses and the two outer recesses respectively. Each of the two stop walls is provided with a connecting hole connected between one of the two inner recesses and one of the two outer recesses. The upper directional body is provided with a directional channel which has a periphery formed with two locking grooves located opposite to each other. The directional channel corresponds to the locking body, and the two locking grooves correspond to the two locking blocks respectively. One of the two locking grooves is located beside the two inner recesses. Each of the two locking grooves has a side provided with two directional through holes. The two directional through holes of one of the two locking grooves are connected to the two inner recesses respectively. The directional brake member includes a lower directional body secured to the upper directional body. The lower directional body has a top formed with a depression which has a bottom provided with a plurality of directional toothed grooves. The depression of the directional brake member corresponds to the directional channel and the two locking grooves of the directional member. The lower directional body has a bottom provided with a braking face. The elastic bar extends through the two directional through holes of each of the two locking grooves of the directional member, and through the annular groove of the drive shank. The elastic bar has two ends extending into the two inner recesses of the directional member. Each of the two resting members includes a resting body mounted in one of the two outer recesses of the directional member, and an extension protruding outward the resting body. The extension of each of the two resting members extends through the connecting hole of one of the two stop walls into one of the two inner recesses of the directional member. The extension of each of the two resting members is provided with an aperture, and each of the two ends of the elastic bar is inserted into the aperture of one of the two resting members.

According to the primary advantage of the present invention, the elastic bar is extended outward by the annular groove of the drive shank when the drive shank is moved, to provide a buffering micro-adjustment effect, such that the directional toothed grooves of the directional brake member align with and exactly engage the locking teeth of the locking member.

According to another advantage of the present invention, the directional toothed grooves of the directional brake member directly align with and engage the locking teeth of the locking member, without needing trial-and-error many times, such that the castor structure is braked easily and quickly, thereby facilitating the user operating and braking the castor structure.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
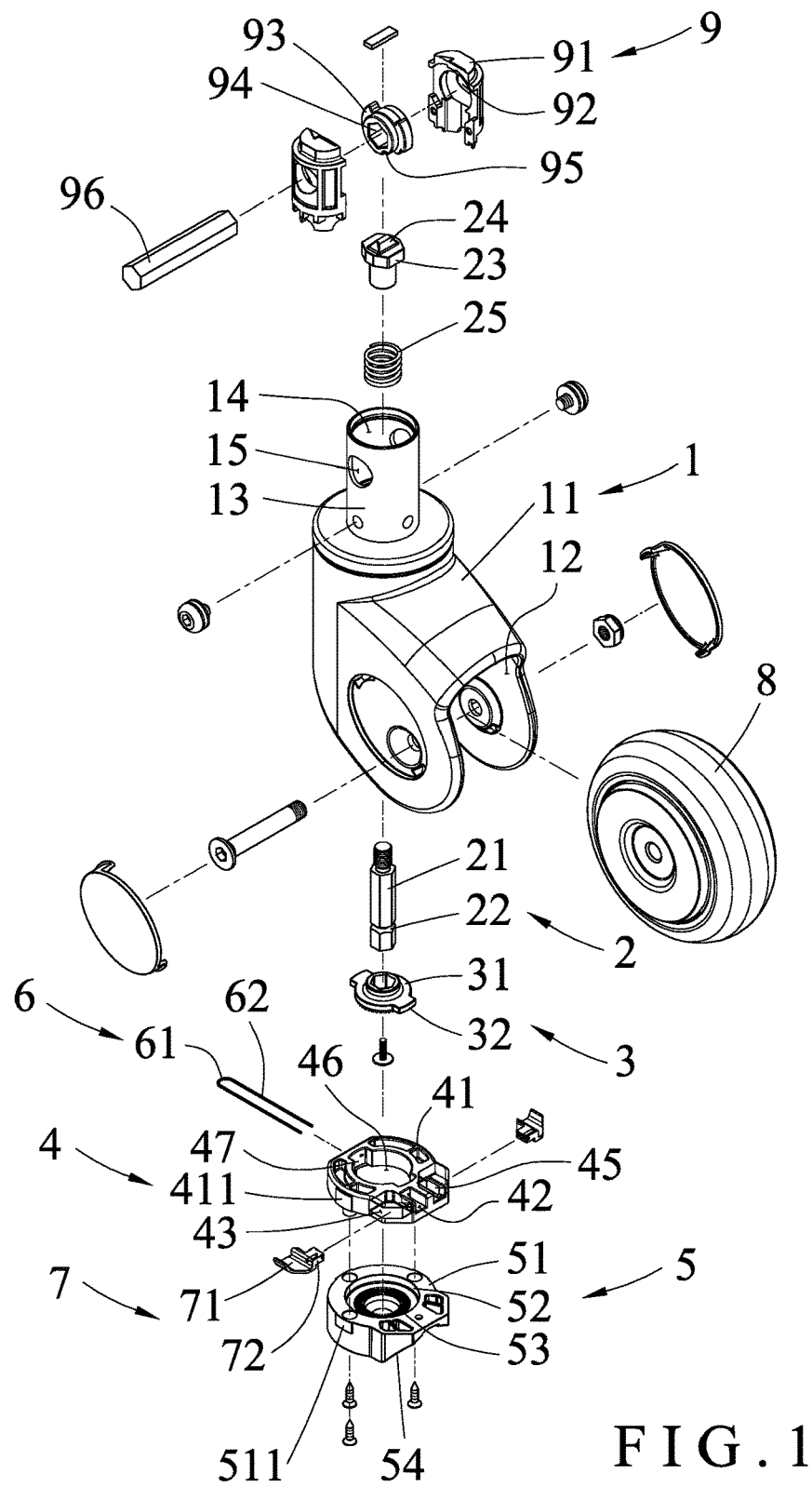
FIG. 1 is an exploded perspective view of a castor structure in accordance with the preferred embodiment of the present invention.
Figure 2:
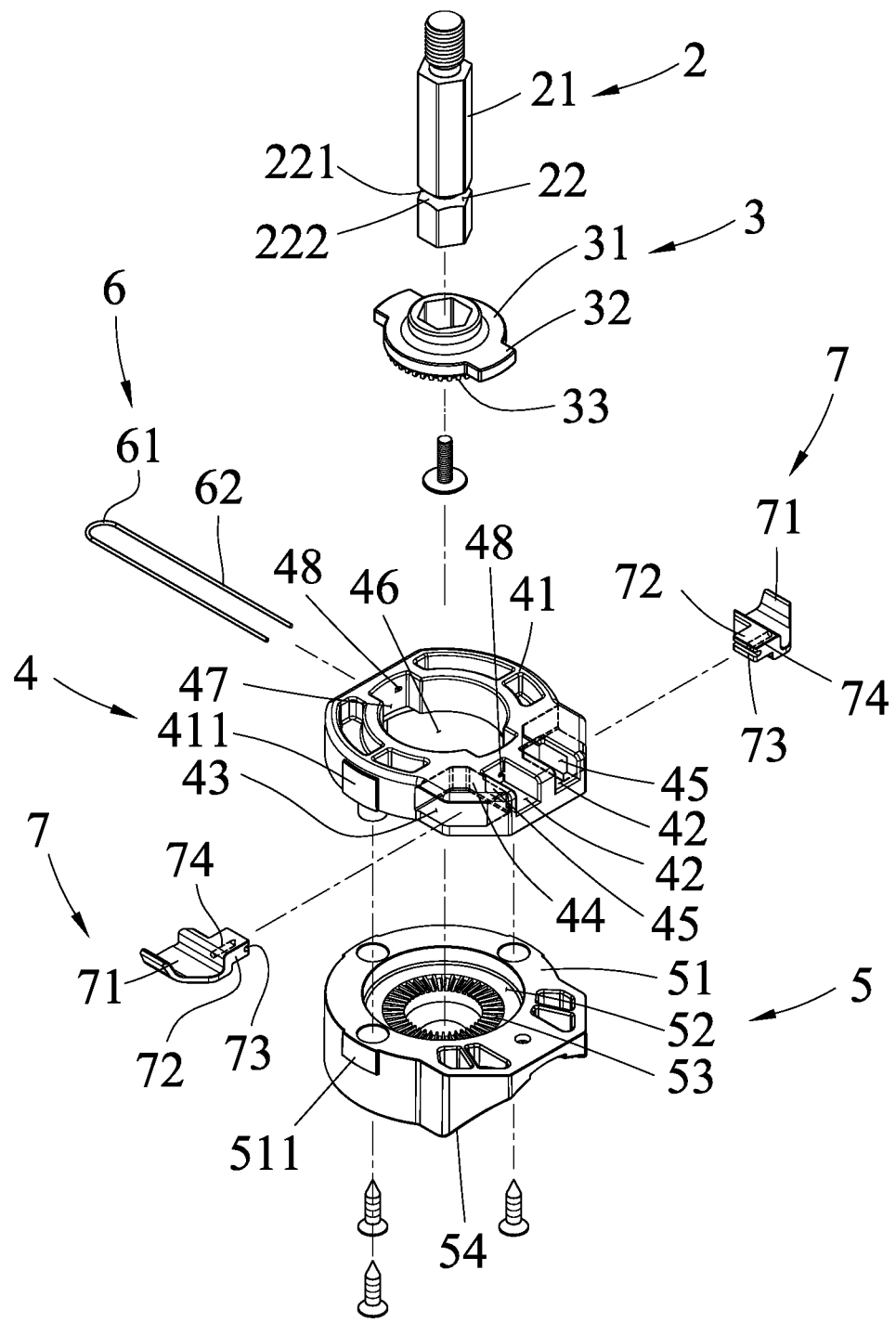
FIG. 2 is a partial exploded perspective view of the castor structure in accordance with the preferred embodiment of the present invention.
Figure 3:
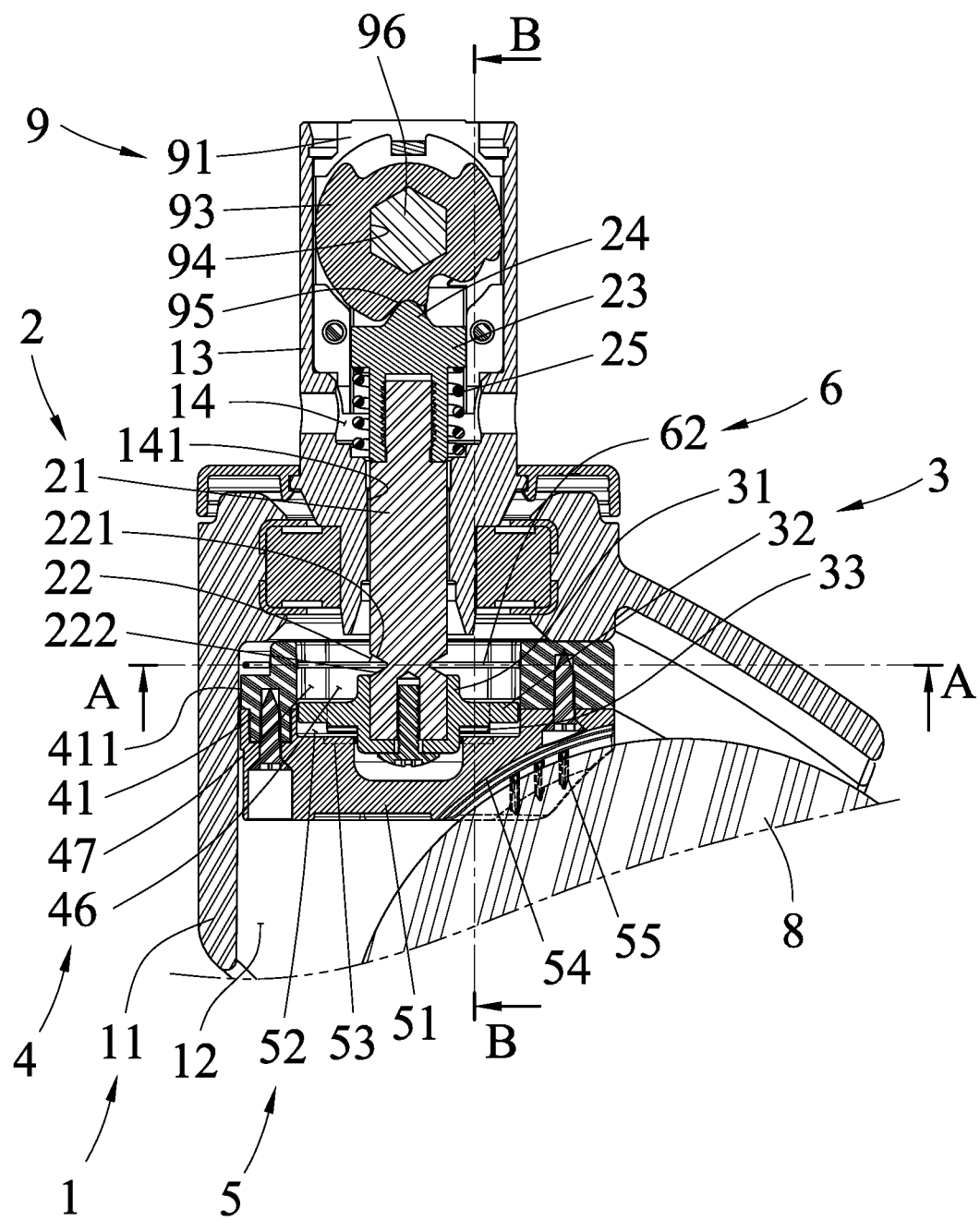
FIG. 3 is a partial cross-sectional assembly view of the castor structure in accordance with the preferred embodiment of the present invention, wherein the castor structure performs a free movement.
Figure 4:
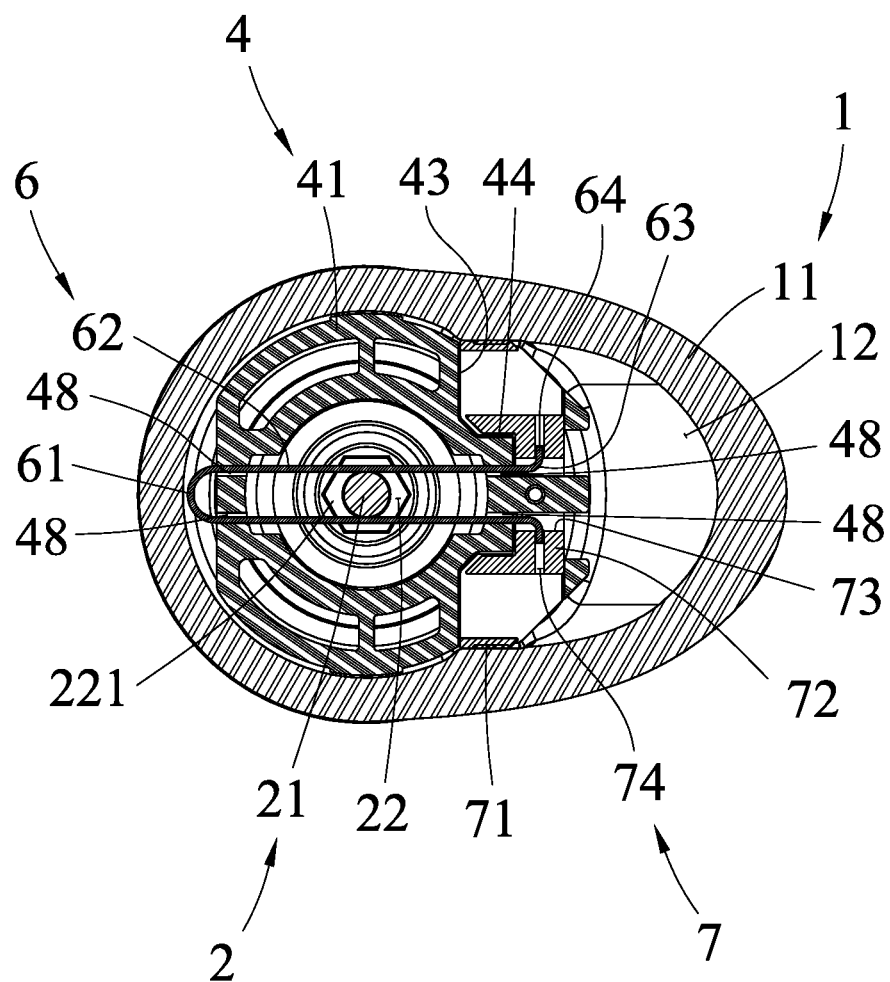
FIG. 4 is a cross-sectional view of the castor structure taken along line A-A as shown in FIG. 3.
Figure 5:
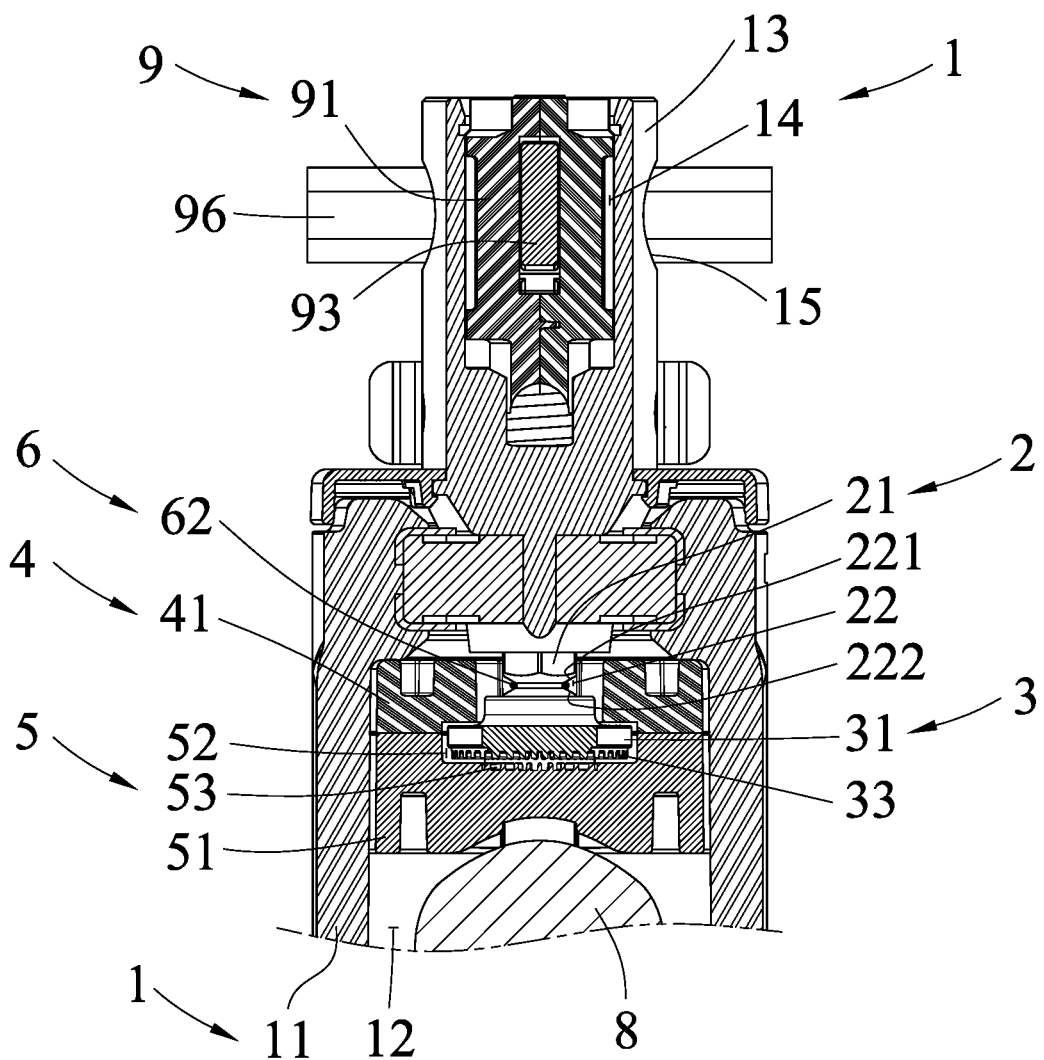
FIG. 5 is a cross-sectional view of the castor structure taken along line B-B as shown in FIG. 3.

Referring to the drawings and initially to FIGS. 1-5, a castor structure in accordance with the preferred embodiment of the present invention comprises a wheel support unit 1, an operation unit 2 mounted on the wheel support unit 1, a locking member 3 mounted on the operation unit 2, a directional (or orientating) member 4 mounted in the wheel support unit 1, a directional (or orientating) brake member 5 located under the directional member 4, a bent elastic bar (or strip) 6 mounted on the directional member 4, and two resting (or abutting or holding) members 7 mounted on the directional member 4.

The wheel support unit 1 includes a housing 11, and a tube 13 pivotally mounted on a top of the housing 11. The housing 11 has a bottom formed with a housing chamber 12. The tube 13 has an interior formed with a tube chamber 14 connected to the housing chamber 12 of the housing 11.

The operation unit 2 includes a drive shank 21 extending through the lower end of the tube chamber 14 of the tube 13. The drive shank 21 has an upper end received in the tube chamber 14 of the tube 13 and a lower end received in the housing chamber 12 of the housing 11. The drive shank 21 has a periphery formed with an annular groove 22 which has an upper tapered face 221 and a lower tapered face 222.

The locking member 3 includes a locking body 31 secured to the lower end of the drive shank 21, two locking blocks 32 protruding from a periphery of the locking body 31 and directed toward two opposite directions, and a plurality of locking teeth 33 mounted on a bottom of the locking body 31 and arranged in an annular shape.

The directional member 4 includes an upper directional body 41 mounted in the housing chamber 12 of the housing 11, and a plurality of projections 411 protruding from the periphery of the upper directional body 41. The upper directional body 41 is provided with two inner recesses 42 adjoining each other, two outer recesses 43 located beside the two inner recesses 42 respectively, and two stop walls 44 located between the two inner recesses 42 and the two outer recesses 43 respectively. Each of the two stop walls 44 is provided with a connecting hole 45 connected between one of the two inner recesses 42 and one of the two outer recesses 43. The upper directional body 41 is provided with a directional channel 46 which has a periphery formed with two locking grooves 47 located opposite to each other. The directional channel 46 corresponds to the locking body 31, and the two locking grooves 47 correspond to the two locking blocks 32 respectively. One of the two locking grooves 47 is located beside the two inner recesses 42. Each of the two locking grooves 47 has a side provided with two directional through holes 48 extending therethrough. The two directional through holes 48 of one of the two locking grooves 47 are connected to the two inner recesses 42 respectively.

The directional brake member 5 includes a lower directional body 51 secured to the upper directional body 41, and a plurality of protrusions 511 protruding from the periphery of the lower directional body 51. The lower directional body 51 has a top formed with a depression 52 which has a bottom provided with a plurality of directional toothed grooves 53 directed toward the locking teeth 33. The depression 52 of the directional brake member 5 corresponds to the directional channel 46 and the two locking grooves 47 of the directional member 4. The directional toothed grooves 53 are arranged in an annular shape. The lower directional body 51 has a bottom provided with a braking face 54. The braking face 54 of the directional brake member 5 is provided with a plurality of braking pieces 55.

The elastic bar 6 extends through the two directional through holes 48 of each of the two locking grooves 47 of the directional member 4, and through the annular groove 22 of the drive shank 21. The elastic bar 6 is made of metallic material and has two ends extending into the two inner recesses 42 of the directional member 4.

Each of the two resting members 7 includes a resting body 71 mounted in one of the two outer recesses 43 of the directional member 4, and an extension 72 protruding outward the resting body 71. The extension 72 of each of the two resting members 7 extends through the connecting hole 45 of one of the two stop walls 44 into one of the two inner recesses 42 of the directional member 4. The extension 72 of each of the two resting members 7 is provided with an aperture 74, and each of the two ends of the elastic bar 6 is inserted into the aperture 74 of one of the two resting members 7. The aperture 74 of each of the two resting members 7 extends to the resting body 71.

In the preferred embodiment of the present invention, the elastic bar 6 includes a first curved section 61, two first straight sections 62 connected with two ends of the first curved section 61 respectively, two second curved sections 63 connected with the two first straight sections 62 respectively, and two second straight sections 64 connected with the two second curved sections 63 respectively. The two first straight sections 62 of the elastic bar 6 extend through the two directional through holes 48 of each of the two locking grooves 47 of the directional member 4 respectively, and through the annular groove 22 of the drive shank 21. The two second curved sections 63 and the two second straight sections 64 of the elastic bar 6 are arranged in the two inner recesses 42 of the directional member 4. Each of the two second straight sections 64 of the elastic bar 6 is inserted into the aperture 74 of one of the two resting members 7.

In the preferred embodiment of the present invention, the extension 72 of each of the two resting members 7 has a side provided with a slot 73 connected to the aperture 74. Each of the two first straight sections 62 of the elastic bar 6 rests on the slot 73 of the extension 72 of each of the two resting members 7. The resting body 71 of each of the two resting members 7 rests on the interior of the housing chamber 12 of the housing 11.

In the preferred embodiment of the present invention, the extension 72 of each of the two resting members 7 has a width smaller than that of the resting body 71, and the connecting hole 45 of each of the two stop walls 44 of the directional member 4 only allows insertion of the extension 72 of each of the two resting members 7, such that the resting body 71 of each of the two resting members 7 is stopped by each of the two stop walls 44 of the directional member 4.

In the preferred embodiment of the present invention, the castor structure further comprises a control unit 9 mounted on the tube 13 of the wheel support unit 1 and connected with the operation unit 2 to control the drive shank 21 at different height positions, and a wheel 8 pivotally mounted in the housing chamber 12 of the housing 11 and located under the braking face 54 of the directional brake member 5.

In the preferred embodiment of the present invention, the operation unit 2 further includes a top sleeve 23 secured to the top of drive shank 21 and having a top provided with a flange 24, and an operation spring 25 mounted on the top sleeve 23 and biased between the top sleeve 23 and an interior of the tube chamber 14 of the tube 13. Preferably, the operation spring 25 is a compression spring. The tube 13 has a periphery formed with a first opening 15. The control unit 9 includes two casings 91 mounted in the tube chamber 14 of the tube 13 and each formed with a second opening 92, a control cam 93 pivotally mounted between the two casings 91 and formed with a third opening 94, and a control shaft 96 extending through the first opening 15 of the tube 13, the second opening 92 of each of the two casings 91 and the third opening 94 of the control cam 93. The two casings 91 are combined together to receive the control cam 93. The control cam 93 has a periphery formed with two cam slots 95 having different depth. The control shaft 96 has a polygonal shape matching that of the third opening 94 of the control cam 93, such that when the control shaft 96 is rotated, the control cam 93 is rotated in concert with the control shaft 96, and one of the two cam slots 95 of the control cam 93 is moved to allow insertion of the flange 24 of the top sleeve 23.

In the preferred embodiment of the present invention, the tube chamber 14 of the tube 13 is provided with a non-rotation section 141 which has a polygonal shape matching that of the drive shank 21. The drive shank 21 is limited by the non-rotation section 141, such that the drive shank 21 is allowed to move upward and downward in the tube chamber 14 of the tube 13 and cannot be rotated. At least one of the upper directional body 41 and the lower directional body 51 has a noncircular cross-sectional profile, and the housing chamber 12 has a corresponding noncircular cross-sectional profile, such that the directional member 4 and the directional brake member 5 are moved with the housing 11 to rotate about the tube 13.

In practice, the tube 13 is secured to an object, such as a medical bed, a machine or furniture. When the control shaft 96 is rotated, the control cam 93 is rotated to push the flange 24 which drives the top sleeve 23, the drive shank 21 and the locking member 3 to move downward, and compresses the operation spring 25. When the control cam 93 is rotated to a position where one of the two cam slots 95 of the control cam 93 aligns with the flange 24, the operation spring 25 is released and pushes the top sleeve 23, the drive shank 21 and the locking member 3 to move upward, such that the flange 24 is inserted into and positioned in one of the two cam slots 95 of the control cam 93. Thus, the flange 24 is inserted into the two cam slots 95 of different depth, such that the locking member 3 is disposed at positions of different height. In such a manner, the castor structure is switched between three modes, including a free movement, a unidirectional displacement and a braked state.

In operation, again referring to FIGS. 1-5, when the flange 24 is locked in one of the two cam slots 95 of with a smaller depth as shown in FIG. 3, the two locking blocks 32 of the locking member 3 are detached from and located under the two locking grooves 47 of the directional member 4 respectively. At the same time, the bottom of the locking member 3 is spaced from the bottom of the depression 52 of the directional brake member 5, such that the locking teeth 33 of the locking member 3 is unlocked from the directional toothed grooves 53 of the directional brake member 5. Thus, the housing 11 drives the directional member 4, the directional brake member 5, and the wheel 8, to swivel relative to the tube 13, while the wheel 8 is rotated relative to the housing 11. Thus, the castor structure performs a free movement.

Figure 6:
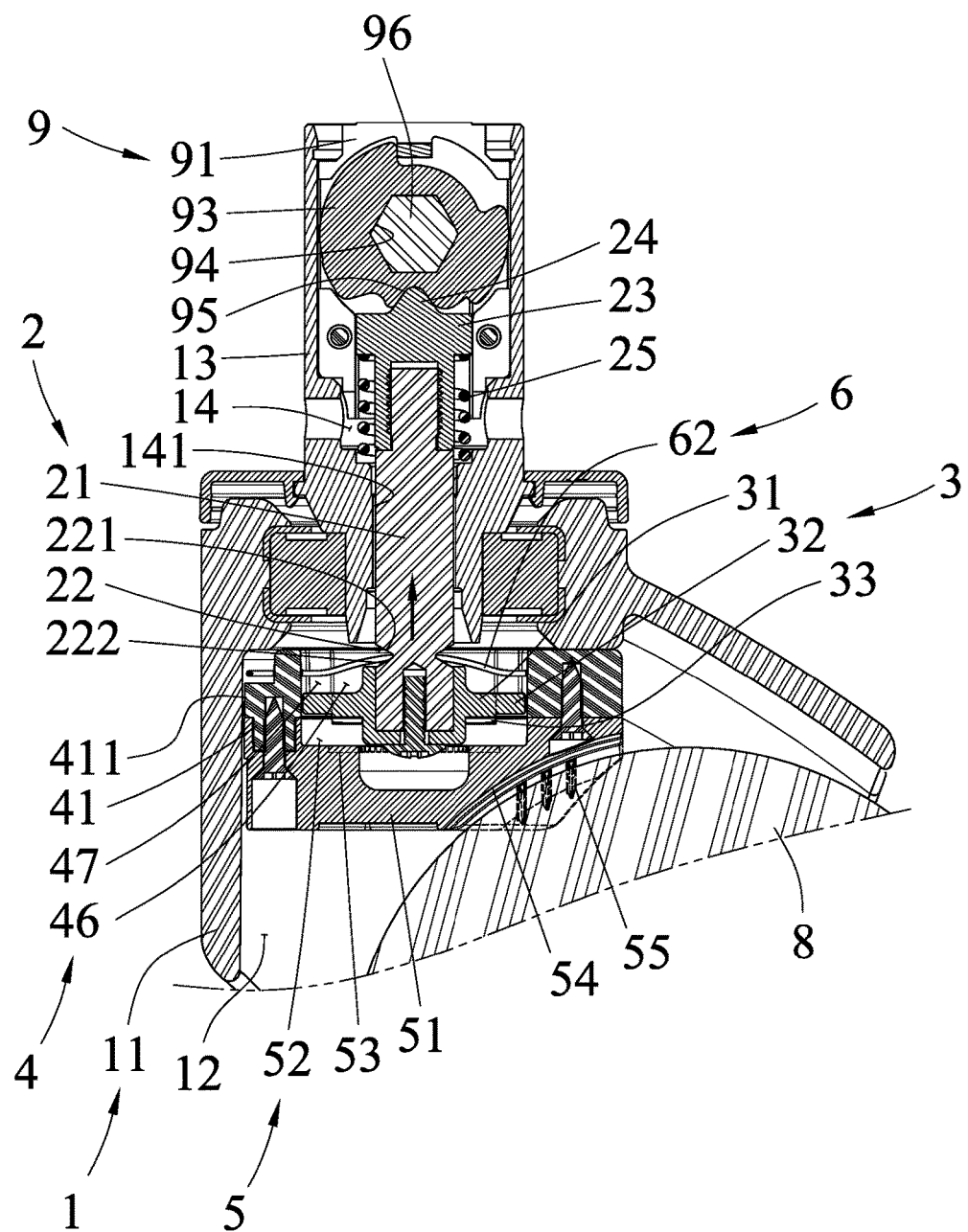
FIG. 6 is a schematic operational view of the castor structure as shown in FIG. 3, wherein the castor structure performs a unidirectional displacement.

Alternatively, referring to FIG. 6 with reference to FIGS. 1-5, when the control cam 93 is rotated to the position as shown in FIG. 6, one of the two cam slots 95 with a greater depth aligns with the flange 24, the operation spring 25 is released and pushes the top sleeve 23, the drive shank 21 and the locking member 3 to move upward, such that the flange 24 is inserted into and positioned in one of the two cam slots 95 with a greater depth. In such a manner, the two locking blocks 32 of the locking member 3 are inserted into and locked in the two locking grooves 47 of the directional member 4 respectively, such that the housing 11, the directional member 4, the directional brake member 5, and the wheel 8, are fixed and cannot swivel relative to the tube 13. At this time, the wheel 8 is still rotated relative to the housing 11. Thus, the castor structure performs a free movement. Thus, the castor structure performs a unidirectional displacement.

Figure 7:
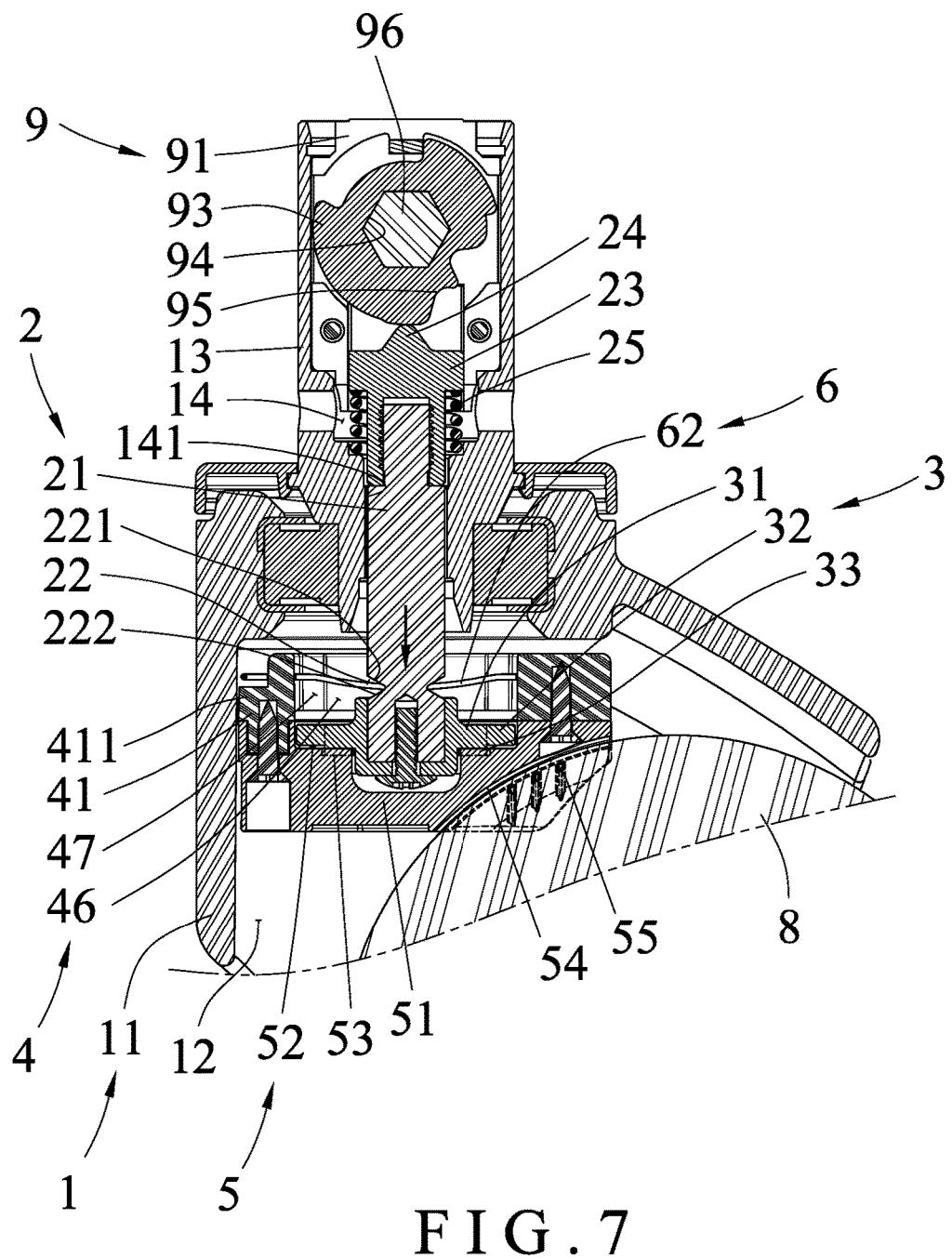
FIG. 7 is a schematic operational view of the castor structure as shown in FIG. 3, wherein the castor structure is disposed at a braked state.

Alternatively, referring to FIG. 7 with reference to FIGS. 1-5, when the control cam 93 is rotated to the position as shown in FIG. 7, the periphery of the control cam 93 pushes the flange 24 downward, such that the top sleeve 23, the drive shank 21 and the locking member 3 are moved downward, and the operation spring 25 is compressed. In such a manner, the locking member 3 is moved downward, and the locking teeth 33 of the locking member 3 engage the directional toothed grooves 53 of the directional brake member 5, such that the housing 11, the directional member 4, and the directional brake member 5 are fixed and cannot swivel relative to the tube 13. At the same time, the locking member 3 pushes the directional member 4 and the directional brake member 5 downward until the braking pieces 55 of the directional brake member 5 closely presses the wheel 8, such that the wheel 8 is braked and cannot be rotated relative to the housing 11. Thus, the castor structure is disposed at a braked state.

It is appreciated that, when the locking teeth 33 of the locking member 3 misalign with the directional toothed grooves 53 of the directional brake member 5 during downward movement of the locking member 3, the locking teeth 33 of the locking member 3 cannot engage the directional toothed grooves 53 of the directional brake member 5 exactly. At this time, the two first straight sections 62 of the elastic bar 6 are pressed outward by the upper tapered face 221 of the annular groove 22 of the drive shank 21 when the drive shank 21 is moved downward as shown in FIG. 7, to produce a driving force between the elastic bar 6 and the upper tapered face 221 of the drive shank 21, such that the elastic bar 6 is slightly rotated along the upper tapered face 221 of the drive shank 21 through a little angle, to drive the directional member 4 and the directional brake member 5 to rotate slightly, thereby producing a micro-adjustment, such that the directional toothed grooves 53 of the directional brake member 5 align with the locking teeth 33 of the locking member 3 gradually. In such a manner, the locking teeth 33 of the locking member 3 gradually slide into and exactly engage the directional toothed grooves 53 of the directional brake member 5. It is to be noted that, FIG. 7 only shows that the two first straight sections 62 of the elastic bar 6 are bent downward. In fact, the two first straight sections 62 of the elastic bar 6 are also extended outward by the slope of the upper tapered face 221 of the drive shank 21.

Accordingly, the elastic bar 6 is extended outward by the annular groove 22 of the drive shank 21 when the drive shank 21 is moved, to provide a buffering micro-adjustment effect, such that the directional toothed grooves 53 of the directional brake member 5 align with and exactly engage the locking teeth 33 of the locking member 3. In addition, the directional toothed grooves 53 of the directional brake member 5 directly align with and engage the locking teeth 33 of the locking member 3, without needing trial-and-error many times, such that the castor structure is braked easily and quickly, thereby facilitating the user operating and braking the castor structure.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A castor structure comprising:
a wheel support unit;
an operation unit mounted on the wheel support unit;
a locking member mounted on the operation unit;
a directional member mounted in the wheel support unit;
a directional brake member located under the directional member;
a bent elastic bar mounted on the directional member; and
two resting members mounted on the directional member; wherein:
the wheel support unit includes a housing, and a tube pivotally mounted on a top of the housing;
the housing has a bottom formed with a housing chamber;
the tube has an interior formed with a tube chamber connected to the housing chamber of the housing;
the operation unit includes a drive shank extending through the tube chamber of the tube;
the drive shank has an upper end received in the tube chamber of the tube and a lower end received in the housing chamber of the housing;
the drive shank has a periphery formed with an annular groove which has an upper tapered face and a lower tapered face;
the locking member includes a locking body secured to the lower end of the drive shank, two locking blocks protruding from a periphery of the locking body, and a plurality of locking teeth mounted on a bottom of the locking body;
the directional member includes an upper directional body mounted in the housing chamber of the housing;
the upper directional body is provided with two inner recesses adjoining each other, two outer recesses located beside the two inner recesses respectively, and two stop walls located between the two inner recesses and the two outer recesses respectively;
each of the two stop walls is provided with a connecting hole connected between one of the two inner recesses and one of the two outer recesses;
the upper directional body is provided with a directional channel which has a periphery formed with two locking grooves located opposite to each other;
the directional channel corresponds to the locking body;
the two locking grooves correspond to the two locking blocks respectively;
one of the two locking grooves is located beside the two inner recesses;
each of the two locking grooves has a side provided with two directional through holes;
the two directional through holes of one of the two locking grooves are connected to the two inner recesses respectively;
the directional brake member includes a lower directional body secured to the upper directional body;
the lower directional body has a top formed with a depression which has a bottom provided with a plurality of directional toothed grooves;
the depression of the directional brake member corresponds to the directional channel and the two locking grooves of the directional member;
the lower directional body has a bottom provided with a braking face;
the elastic bar extends through the two directional through holes of each of the two locking grooves of the directional member, and through the annular groove of the drive shank;
the elastic bar has two ends extending into the two inner recesses of the directional member;
each of the two resting members includes a resting body mounted in one of the two outer recesses of the directional member, and an extension protruding outward the resting body;
the extension of each of the two resting members extends through the connecting hole of one of the two stop walls into one of the two inner recesses of the directional member;
the extension of each of the two resting members is provided with an aperture; and
each of the two ends of the elastic bar is inserted into the aperture of one of the two resting members.

2. The castor structure of claim 1, wherein:
the elastic bar includes a first curved section, two first straight sections connected with two ends of the first curved section respectively, two second curved sections connected with the two first straight sections respectively, and two second straight sections connected with the two second curved sections respectively;
the two first straight sections of the elastic bar extend through the two directional through holes of each of the two locking grooves of the directional member respectively, and through the annular groove of the drive shank;
the two second curved sections and the two second straight sections of the elastic bar are arranged in the two inner recesses of the directional member; and
each of the two second straight sections of the elastic bar is inserted into the aperture of one of the two resting members.

3. The castor structure of claim 1, wherein the extension of each of the two resting members has a side provided with a slot connected to the aperture.

4. The castor structure of claim 1, wherein the extension of each of the two resting members has a width smaller than that of the resting body, and the connecting hole of each of the two stop walls of the directional member only allows insertion of the extension of each of the two resting members.

5. The castor structure of claim 1, further comprising:
a control unit mounted on the tube of the wheel support unit and connected with the operation unit to control the drive shank at different height positions.

* * * * *